United States Patent
Boothman et al.

(10) Patent No.: US 6,206,122 B1
(45) Date of Patent: Mar. 27, 2001

(54) VEHICLE BODY PANEL ASSEMBLY

(75) Inventors: Andrew James Christopher Boothman, Coventry (GB); Malcolm Shute, Beauvais (FR)

(73) Assignee: AGCO Limited (GB)

( * ) Notice: Subject to any disclaimer, the term of this patent is extended or adjusted under 35 U.S.C. 154(b) by 0 days.

(21) Appl. No.: 08/982,631

(22) Filed: Dec. 2, 1997

(30) Foreign Application Priority Data

Dec. 4, 1996 (GB) .................................................. 9625149

(51) Int. Cl.[7] .................................................. B62D 25/10
(52) U.S. Cl. ..................... 180/89.17; 180/69.21; 296/194; 296/196; 29/468
(58) Field of Search ................ 180/69.2, 69.24, 180/89.17, 89.1, 69.21; 296/191, 194, 196, 203.01, 203.02, 29; 29/464, 468, 271

(56) References Cited

U.S. PATENT DOCUMENTS

| | | | |
|---|---|---|---|
| 1,213,401 | * 1/1917 | Neveu ................................. | 180/69.2 |
| 2,962,107 | * 11/1960 | Mihal et al. ......................... | 296/194 |
| 3,815,701 | * 6/1974 | Mayhew .............................. | 180/69.21 |
| 4,969,533 | * 11/1990 | Holm et al. .......................... | 180/69.2 |
| 5,123,695 | * 6/1992 | Kanemitsu et al. .................. | 296/194 |
| 5,181,304 | * 1/1993 | Piotrowski ............................. | 29/468 |
| 5,271,473 | * 12/1993 | Ikeda et al. .......................... | 296/194 |
| 5,358,304 | * 10/1994 | Kanemitsu et al. .................. | 296/194 |
| 6,030,029 | * 2/2000 | Tsuda et al. ......................... | 296/194 |

FOREIGN PATENT DOCUMENTS 2242168   9/1991  (GB) .

* cited by examiner

*Primary Examiner*—Lanna Mai
*Assistant Examiner*—Lynda Jasmin
(74) *Attorney, Agent, or Firm*—MacMillan, Sobanski & Todd, LLC

(57) ABSTRACT

A body panel assembly for a tractor engine hood comprises a top panel (8), side panels (12) and a front grille panel (18). Forward ends of the top and side panels are secured to a frame (3) mounted on or integral with the front of the tractor chassis (1). The grille panel (18) is mounted at least partially by releasable means on an alignment member or members (17, 26) whose exact position may be adjusted during the assembly process to ensure accurate alignment of the front grille panel (18) to the side panel (12).

34 Claims, 3 Drawing Sheets

VEHICLE BODY PANEL ASSEMBLY

BACKGROUND OF THE INVENTION

The present invention relates to a vehicle body panel assembly for a vehicle having a chassis, and to a method for assembling the same. The invention is particularly suited to a tractor engine hood or bonnet assembly.

A problem encountered when assembling two or more body panels to a frame is that of aligning the panels with respect to each other, so that a uniform small gap is maintained between the edges of the respective panels. The problem is particularly apparent when the precise position and orientation of a given panel is determined by a mounting point or points remote from an edge of that panel which needs to be lined up closely with an adjacent panel. The problem is also more evident in assemblies where one of the panels needs to be easily released by some latching means.

SUMMARY OF THE INVENTION

An object of the present invention is to alleviate the problem at least in part.

To this end, a body panel assembly is provided for a vehicle having a chassis, the assembly comprising:

(a) a frame which is, in use, fast with respect to the chassis;

(b) a first body panel secured with respect to the frame;

(c) an alignment member secured to the frame by adjustable fastening means which permit adjustment of the relative positions of the alignment member and frame; and (d) a second body panel mounted on the alignment member;

whereby, in use, the first and second body panels may be located with respect to each other by adjusting the position of the alignment member with respect to the frame.

It will be appreciated that this arrangement permits adjustments to the position and orientation of the second panel to be made to ensure that the edges of the first and second panels are accurately aligned. Accurate alignment of the panels is obviously important for aesthetic reasons, and also to ensure that the panel assembly is providing the intended degree of protection from weather, etc, to the interior space defined within the assembly.

The invention defined above is particularly useful when the second body panel needs to be releasably mounted, since a releasable latch assembly can be mounted on the alignment member.

Preferably, the alignment member is pivotally secured to the frame adjacent a first substantially straight edge of the second body panel whereby the alignment member is pivotable about an axis substantially parallel to the said edge until secured by the said adjustable fastening means.

This arrangement is particularly useful where the precise dimensions of the gap between the adjacent panels is not critical but it is important that the gap is uniform all the way along the adjacent edges of the respective panels. The permanent pivotal connection between the alignment member and frame along one edge of the second panel fixes the position of that edge of the second panel. To align a roughly perpendicular edge of the second panel with another panel, it is necessary only to rotate the alignment member until the gap between the adjacent panel edges is uniform. This obviously simplifies the alignment procedure by reducing the number of degrees of freedom of the alignment member.

An alternative is for the alignment member to be mounted on the frame, such that the adjustment permitted by the adjustable fastening means constitutes sliding in a plane substantially perpendicular to the general plane of the second panel.

Again, this arrangement involves limiting the degrees of freedom for the alignment member and therefore simplifies the alignment operation. With this arrangement, the second panel may be mounted directly to the frame at a mounting point or points adjacent one edge of the panel, and the position of the opposite edge of the panel, which is mounted on the alignment member, determined by the adjustable fastening means.

Another possibility is to provide close tolerance apertures in the first body panel and alignment member respectively, a corresponding aperture of large dimensions being provided in the frame, whereby during assembly the relative positions of the first panel and alignment member may be set by inserting an aligning rod, whose dimensions closely match the said close tolerance apertures, through the said apertures in the first panel, frame and alignment member respectively.

This arrangement may be useful when the degrees of freedom of the alignment member are not restricted by mounting it for pivotal or sliding movement only.

According to the invention, a method is also provided with optional features set out in the claims dependent thereon.

DETAILED DESCRIPTION

Figure 1:
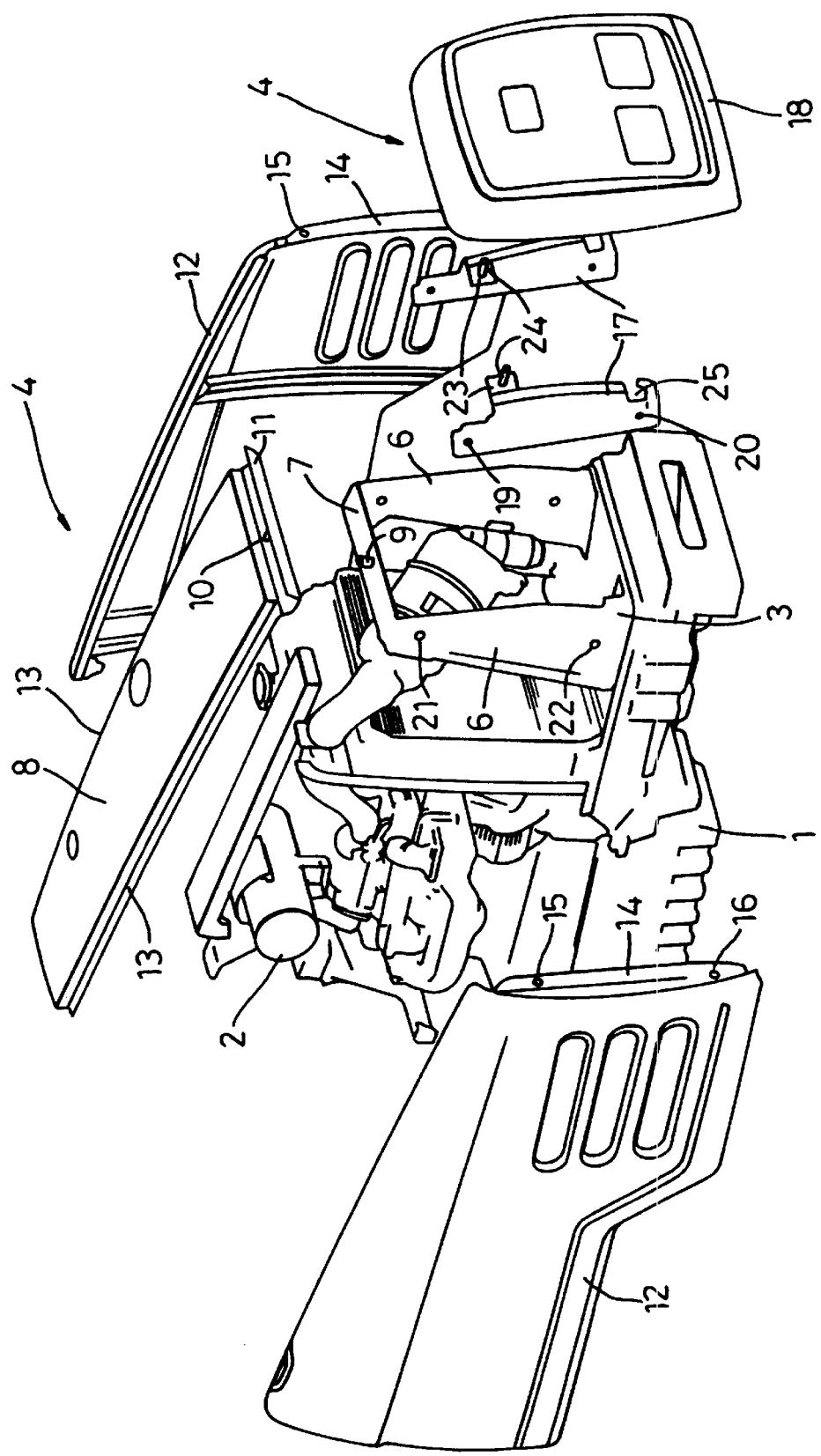
FIG. 1 is an exploded perspective view of a first embodiment of tractor body panel assembly in accordance with the invention.

The first embodiment will now be described with reference to FIG. 1. The front portion 1 of the chassis of an agricultural tractor is shown in FIG. 1. An engine 2 is shown mounted on the chassis 1 and, in front of that, a front mounting bracket or frame 3 is bolted to the chassis 1 whose purpose is to provide a forward mounting for the hood or bonnet panelling shown generally at 4.

The frame 3 is, in very general terms, a piece of inverted "U" section plate steel with side members 6 bolted to and extending upwardly from the chassis and a top member 7 extending between the upper ends of the side members 6. In this embodiment, the frame 3 is a unitary member but it could equally well comprise a number of separate members bolted together or alternatively it could be cast integrally with the chassis 1.

A top body panel 8 comprising the top of the engine hood is located at its forward end on the top member 7 by means of an upstanding spigot 9 on the top member which is received in a fairly closely toleranced aperture 10 in a channel portion 11 of the top panel 8. The rear of the top panel 8 is secured to the rear of the engine, in practice, but this is not relevant to the present invention other than to mention that the distance between these two mounting points (a meter or more) will obviously affect the precision of the alignment of the front and rear mounting points.

Side panels 12 are hung from each side edge 13 of the top panel 8 by conventional means such as locating pegs. Each side panel 12 is formed with a flange 14 along its forward edge which, when the panel assembly is complete, is not visible. Formed in the flange 14 of each side panel 12 are upper 15 and lower 16 closely toleranced apertures.

Right and left alignment members 17 are provided, which are secured to the inside surfaces of the side members 6 of the mounting frame 3. The purpose of the alignment members is to carry a front grille panel member 18.

Each alignment member 17 is formed with upper 19 and lower 20 close tolerance apertures corresponding with the upper and lower apertures on the respective side panel flange 14. Approximately in registry with these holes in the flange and alignment member are relatively large upper 21 and lower 22 apertures in each side member 6 of the mounting frame 3.

Formed on the front edge of each alignment member 17 is an inwardly turned (or alternatively outwardly turned) flange 23 carrying one part 24 of a releasable latch, the corresponding part (not shown) being on the inner face of the front grille panel 18.

At the base of each alignment member 17 is an upwardly opening slot 25 which comprises part of a releasable hinge mounting between the alignment member and the front grille panel 18. The corresponding part of the hinge mounting comprises a simple horizontal bar (not shown) mounted on the inner face of the grille panel 18 at the bottom. The location of these parts of the hinge mounting may of course be reversed.

To assemble the front grille panel 18 to the remainder of the body panel assembly, the alignment members 17 are first of all located with respect to the frame 3 and side panels 12. An alignment member 17 is first offered up to the interior surface of the corresponding side member 6 so that the apertures 19 and 20 are approximately in line with the apertures 21 and 22 in the side member 6. The apertures 15 and 16 in the side panel flange 14 will already be approximately in registry with the apertures 21, 22 in the side members 6. An alignment device (not shown) comprising a circular cross section rod, which is a close tolerance fit in the apertures 15, 16, 19, 20 in the flange 14 and alignment member 17, is then inserted through the upper apertures 15, 19 and 21. The upper part of the alignment member 17 is thereby accurately aligned with respect to the side panel 12, provided the alignment member is retained closely against the interior surface of the side member 6 so that the alignment device is retained perpendicular to the flange 14, side member 6 and alignment member 17.

The upper part of the alignment member 17 is then retained in place whilst the alignment device is removed and re-inserted in to the lower apertures 16, 20, 22 and the procedure repeated. Alternatively, the alignment device may be left in position in the upper apertures and a further alignment device inserted into the lower apertures.

Once the location of the alignment member with respect to the side panel is completed, the member is held in place whilst the alignment device or devices is/are removed and bolts are then inserted through the upper and lower sets of holes in the side panel, side member and alignment member to secure the three together. It will be appreciated that once the bolts are tightened, any free play permitted by the relatively large apertures 21, 22 in the side member 6 and which was necessary to adjust the position of the alignment member 17 will no longer be possible. Similarly any free play permitted between the bolts and the apertures 15, 16, 19, 20 in the flange 14 and alignment member 17 will be prevented once the bolts are fully tightened.

A similar procedure is then carried out for the side panel 12 and alignment member 17 on the opposite side of the frame 3.

The grille panel 18 may then be simply mounted on the alignment members 17 by inserting the horizontal bars mentioned above on the interior face of the grille panel 18 into the slots 25 on the alignment members and then hinging the grille panel 18 against the alignment members so that the releasable latches engage.

Because of the relatively small distances involved, it is not a difficult matter to ensure a high degree of precision in the alignment of the grille panel 18 to the alignment members 17. Therefore by ensuring precision alignment of the alignment members with respect to the side panels 12, the gap between the grille panel 18 and the exterior surface of each side panel 12 can be set with accuracy and precision.

In a modification of this embodiment, additional apertures (not shown) which need not be closely toleranced are provided in each flange 14, side member 6 and alignment member 17 for receiving fastening bolts. In this case, the alignment device or devices are maintained in place whilst bolts are fitted to this further set of apertures to fasten the alignment member to the frame 3 and side panel 12, whereafter the alignment device or devices is/are removed.

Figure 2:
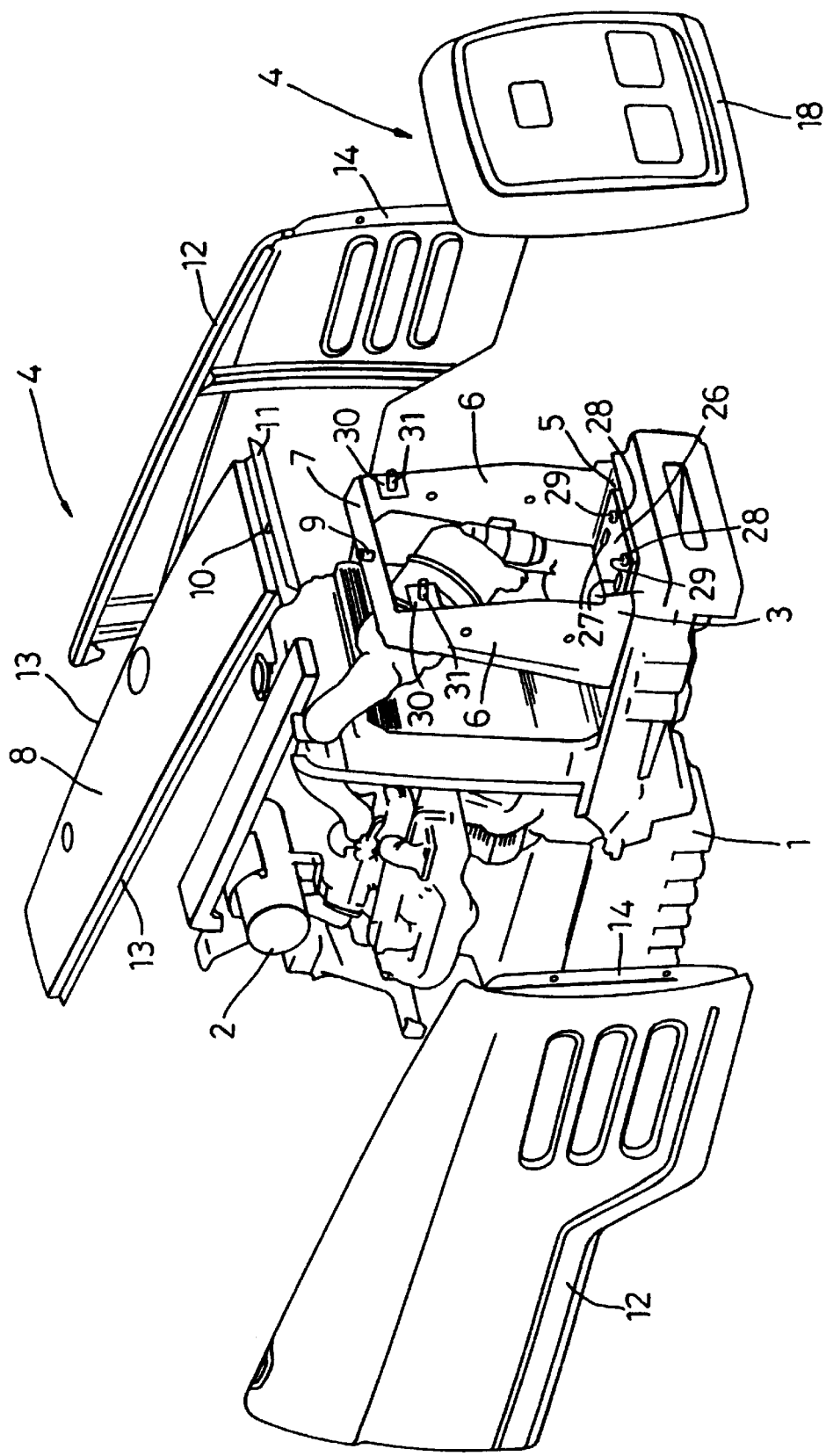
FIG. 2 is an exploded perspective view of a second embodiment of tractor body panel assembly in accordance with the invention.

The second embodiment will now be described with reference to FIG. 2. Much of the structure described with reference to the first embodiment is identical, and the components numbered 1 to 14 in connection with the first embodiment are identical to the similarly numbered components shown in FIG. 2 with the exception of the side members 6, as explained below.

The side panels 12 are, as in the first embodiment, bolted to the side members 6 of the mounting frame 3.

The alignment members 17 of the first embodiment are, however, replaced by a single alignment member 26 in the form of a plate mounted on the chassis 1 or on a base member 5 of the mounting frame 3 by means of two bolts passing through elongate holes 27 in the alignment member 26. The alignment member 26 is also formed with upstanding lugs 28 towards the forward edge thereof Each lug 28 has an upwardly open slot 29 formed in it.

The side members 6 of the frame 3 are different to those of the first embodiment in that they are equipped only with simple apertures corresponding to the apertures in the flanges 14 for bolting the side panels 12 to the frame 3. In the upper region of the side panels, on the front edge thereof, are formed inwardly directed flanges 30. Each flange 30 carries part 31 of a releasable latch mechanism, similar to the latch parts 24 in the first embodiment.

The grille panel 18 is identical or very similar to the panel of the first embodiment in that it is formed with bar members on the bottom edge of the inside face for co-operating with the slots 29 to form a releasable hinge, and also with corresponding parts of latch mechanisms for engaging with the latch mechanism parts 31 on the flanges 30.

To assemble the second embodiment, the grille member 18 is mounted on the latch mechanism parts 31 and in the slots 29. The lower end of the grille panel 18 is then moved in and out with the alignment member 26. The small amount of pivotal movement necessary at the upper part of the panel 18 is permitted by the latches 31, and the inward and outward movement of the lower part of the panel 18 and alignment member 26 is permitted by the elongate nature of the bolt holes 27 in the alignment member 26.

It will be appreciated that the gap between the top panel 8 and the upper edge of the grille panel 18 and the upper parts of the gaps between the grille panel and the side members 12 is set, and the pivotal adjusting movement of the panel 18 will not substantially affect this gap, since the pivot axis, at the latches 31, is very near the upper edge of the grille panel 18.

One of a series of differently sized spacer devices, (eg simple plastic blocks), is found which fits in the gap between the top panel 8 and the upper edge of the grille member 18. The grille member 18 is then moved in or out until this same spacer device is a snug fit in the entire length of the gap between each side panel 12 and the grille panel 18.

The grille panel is then removed and the mounting bolts in the slots 27 tightened to secure the alignment member 26 to the base member 5 of the frame 3.

It will be appreciated that the second embodiment allows the alignment of the grille panel 18 with respect to the side panels 12 to be set with accuracy and precision, but relies on other aspects of the body panel assembly for the accuracy and precision of the dimensions of the spacing.

Figure 3:
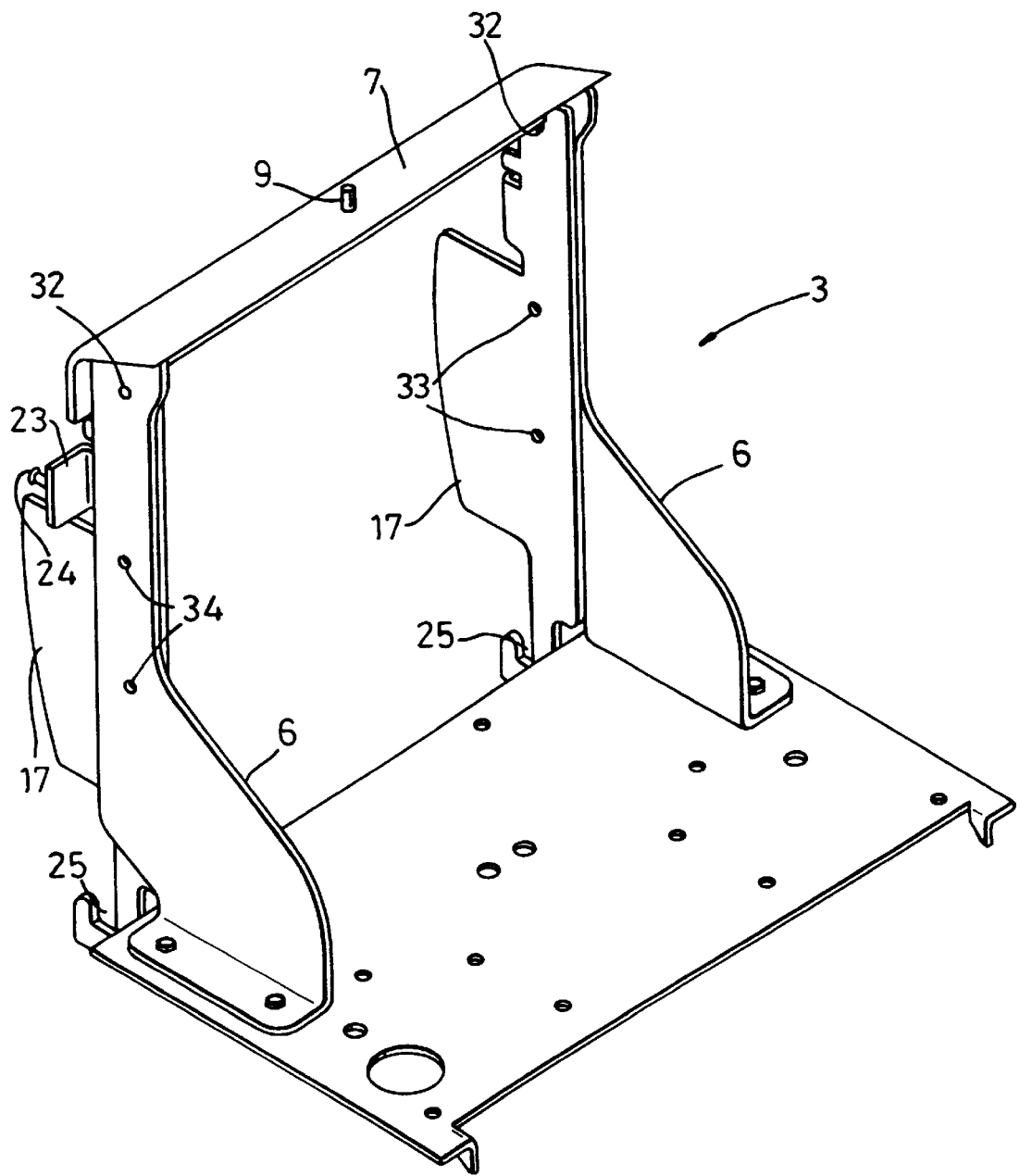
FIG. 3 is a perspective view of the frame and alignment members of a third embodiment of body panel assembly in accordance with the invention.

A third embodiment will now be described with reference to FIG. 3. FIG. 3 shows only the mounting frame 3 and alignment members 17 of the third embodiment. The mounting frame 3 is of slightly different design to the first and second embodiments, and the alignment members 17 are of similar design to the alignment members of the first embodiment, although with slight differences as will be explained below. The reference numerals for parts of the mounting frame 3 and alignment members 17 which essentially correspond between first and third embodiments are retained.

The third embodiment is similar to the second embodiment in that the intention is to use the alignment members only to ensure that the gap between the top and side panels and the front grille panel 18 is constant, and reliance is placed on different aspects of the structure to ensure the accuracy and precision of the exact dimension of the gap.

In the third embodiment, two vertically orientated alignment members 17 are provided as in the first embodiment. However, these alignment members 17 are hinged at 32 to the respective side members 6. As in the first embodiment, each alignment member 17 carries a flange 23 to which is attached part 24 of a releasable latch mechanism. Mounting holes 33 are provided for fixing the exact orientation of the alignment member to the respective side member 6 via mounting holes 34 in the side member. The holes 33, 34 and the bolts used sized so as to allow a certain amount of free play until the bolts are tightened.

At the bottom of each alignment member 17 is formed an upwardly open slot 25 as in the first embodiment.

As with the first embodiment, the front grille panel 18 is releasably mounted in the slots 25 and on the latch 24, by means of corresponding parts on the interior surface of the grille panel 18.

To assemble the third embodiment, the grille panel is first mounted on the alignment member 17, as with the second embodiment. A spacer device is then used to ensure that the gap at the top and on each side of the grille panel 18 is uniform. Once this is done, the grille panel is removed and the alignment members bolted to the respective side members 6.

There is an alternative method of assembly which may be used with the second and third embodiments. It may be possible to produce a series of grille panels 18 with sufficiently high precision for a dummy panel to be fitted when aligning the panels using the spacer device. This dummy has cutaway portions on each side, allowing access to the bolts 17, 26 for securing the alignment member. Once the assembly is secured with a uniform gap between the dummy and adjacent panels, the dummy is removed and one of the series of normal grille panels fitted.

What is claimed is:

1. A body panel assembly for a vehicle having a chassis, the assembly comprising:
   (a) a frame having means for securement to the chassis;
   (b) a first body panel secured to said frame;
   (c) an alignment member supported with respect to said frame by adjustable fastening means, said adjustable fastening means permitting adjustment of the relative positions of said alignment member and said frame; and
   (d) a second body panel mounted on said alignment member, said second body panel being capable of being aligned with said first body panel by virtue of said adjustable fastening means.

2. The body panel assembly defined in claim 1 wherein said first body panel is a top body panel.

3. The body panel assembly defined in claim 1 wherein said frame includes a spigot, and wherein said first body panel has an aperture formed therethrough that receives said spigot to secure said first body panel to said frame.

4. The body panel assembly defined in claim 1 wherein said adjustable fastening means includes an aperture formed through said frame and an aperture formed through said alignment member, said apertures being alignable with one another.

5. The body panel assembly defined in claim 1 wherein said adjustable fastening means includes a pair of apertures formed through said frame and a pair of apertures formed through said alignment member, said pairs of apertures being alignable with one another.

6. The body panel assembly defined in claim 1 wherein said alignment member includes a releasable latch for mounting said second body panel on said alignment member.

7. The body panel assembly defined in claim 1 wherein said frame is a generally inverted-U shaped member having a pair of side members, and further including a pair of alignment members supported with respect to said frame by respective adjustable fastening means.

8. The body panel assembly defined in claim 7 wherein each of said adjustable fastening means includes an aperture formed through each of said side members of said frame and an aperture formed through each of said alignment members, said apertures being alignable with one another.

9. The body panel assembly defined in claim 7 wherein each of said adjustable fastening means includes a pair of apertures formed through said frame and a pair of apertures formed through each of said alignment members, said pairs of apertures being alignable with one another.

10. The body panel assembly defined in claim 7 wherein said each of said alignment members includes a releasable latch for mounting said second body panel on said alignment member.

11. The body panel assembly defined in claim 1 wherein said alignment member is a plate that is supported for sliding movement relative to said frame.

12. The body panel assembly defined in claim 1 wherein said plate has a lug provided thereon, and wherein said second body panel engages said lug.

13. The body panel assembly defined in claim 1 wherein said plate has a pair of lugs provided thereon, and wherein said second body panel engages said lugs.

14. The body panel assembly defined in claim 1 wherein said frame includes a releasable latch for mounting said second body panel on said frame.

15. The body panel assembly defined in claim 1 wherein said frame includes a pair of releasable latches for mounting said second body panel on said frame.

16. The body panel assembly defined in claim 1 wherein said alignment member is hinged to said frame.

17. The body panel assembly defined in claim 1 further including a pair of alignment members, wherein each of said alignment members is hinged to said frame.

18. A body panel assembly for a vehicle having a chassis, said assembly comprising:

a frame adapted to be secured to the chassis;

a first body panel supported on said frame in a substantially fixed position relative thereto;

an alignment member adapted to be secured to at least one of said frame or the chassis; and a second body panel adapted to be mounted on said alignment member, said alignment member being adjustable relative to said frame so as to permit adjustment of said second body panel relative to said first body panel.

19. The body panel assembly defined in claim 18 wherein said first body panel is a top body panel.

20. The body panel assembly defined in claim 18 wherein said frame includes a spigot, and wherein said first body panel has an aperture formed therethrough that receives said spigot to secure said first body panel to said frame.

21. The body panel assembly defined in claim 18 wherein an aperture is formed through said frame and an aperture is formed through said alignment member, said apertures being alignable with one another.

22. The body panel assembly defined in claim 18 wherein a pair of apertures is formed through said frame and a pair of apertures is formed through said alignment member, said pairs of apertures being alignable with one another.

23. The body panel assembly defined in claim 18 wherein said alignment member includes a releasable latch for mounting said second body panel on said alignment member.

24. The body panel assembly defined in claim 18 wherein said frame is a generally inverted-U shaped member having a pair of side members, and further including a pair of alignment members supported with respect to said frame by respective adjustable fastening means.

25. The body panel assembly defined in claim 24 wherein each of said adjustable fastening means includes an aperture formed through each of said side members of said frame and an aperture formed through each of said alignment members, said apertures being alignable with one another.

26. The body panel assembly defined in claim 24 wherein each of said adjustable fastening means includes a pair of apertures formed through said frame and a pair of apertures formed through each of said alignment members, said pairs of apertures being alignable with one another.

27. The body panel assembly defined in claim 24 wherein said each of said alignment members includes a releasable latch for mounting said second body panel on said alignment member.

28. The body panel assembly defined in claim 18 wherein said alignment member is a plate that is supported for sliding movement relative to said frame.

29. The body panel assembly defined in claim 18 wherein said plate has a lug provided thereon, and wherein said second body panel engages said lug.

30. The body panel assembly defined in claim 18 wherein said plate has a pair of lugs provided thereon, and wherein said second body panel engages said lugs.

31. The body panel assembly defined in claim 18 wherein said frame includes a releasable latch for mounting said second body panel on said frame.

32. The body panel assembly defined in claim 18 wherein said frame includes a pair of releasable latches for mounting said second body panel on said frame.

33. The body panel assembly defined in claim 18 wherein said alignment member is hinged to said frame.

34. The body panel assembly defined in claim 18 further including a pair of alignment members, wherein each of said alignment members is hinged to said frame.

* * * * *